United States Patent [19]

Wilde

[11] 4,402,751
[45] Sep. 6, 1983

[54] BUILDING MATERIAL AND METHOD OF MANUFACTURING SAME

[76] Inventor: Bryce B. Wilde, Rte. 7, Box 62, Muskogee, Okla. 74401

[21] Appl. No.: 324,612

[22] Filed: Nov. 24, 1981

[51] Int. Cl.³ .............................................. C04B 7/353
[52] U.S. Cl. ........................................ 106/93; 106/99; 106/119
[58] Field of Search ..................... 106/90, 93, 99, 118, 106/119

[56] References Cited

U.S. PATENT DOCUMENTS

| | | | |
|---|---|---|---|
| 890,974 | 6/1908 | Fitzsimmons et al. | 106/119 |
| 1,000,295 | 8/1911 | Rumel | 106/119 |
| 1,635,212 | 7/1927 | Herrly | 106/119 |
| 1,635,391 | 7/1927 | Wood | 106/119 |
| 2,556,031 | 6/1951 | Dickey et al. | 106/119 |
| 3,705,837 | 12/1972 | Breslauer | 106/99 |
| 3,734,988 | 5/1973 | Aintablian | 106/90 |

*Primary Examiner*—James Poer
*Attorney, Agent, or Firm*—Head, Johnson & Stevenson

[57] ABSTRACT

A building material and method of manufacture thereof wherein the building material comprises a concrete-type mixture containing fibers or other waste products as a component of the mixture, and the method of manufacture includes adding lime in preselected quantities or ratios by volume to the organic waste produce, permitting the limed mixture to season and cure to produce an aggregate material for use in substantially any standard concrete recipe for creating a building material of great strength, which is lightweight and substantially fireproof.

12 Claims, No Drawings

BUILDING MATERIAL AND METHOD OF MANUFACTURING SAME

BACKGROUND OF THE INVENTION

1. Field of the Invention

This invention relates to improvements in building materials and more particularly but not by way of limitation, to a building material and method of making same from normally waste products.

2. Description of the Prior Art

The manufacture of building materials such as concrete and the like from a mixture of components including wood fibers has been explored for many years. In fact, the use of straw in the making of bricks was practiced by the early Egyptians and attempts to utilize sawdust and the like have been investigated and experimented with for many years. Walter R. Friberge has made an extensive study of the utilization of sawdust in the manufacture of concrete and is the author of a publication of the University of Idaho dated October, 1953, relating to his activities in the field. The use of wood fibers such as sawdust in the manufacture of concrete results in a lightweight and insulative product that is very desirable, but prior experiments utilizing sawdust in combination with cement for the manufacture of concrete have been largely inefficient in that they require great quantities of cement in proportion to the sawdust in order to achieve the necessary strength for the end product. This resulted in a building material which was both expensive and heavy. In the Friberge method it was found that the addition of diatomite material to the sawdust tended to overcome some of the prior disadvantages. Diatomite is usually mined by open pit methods and the supply apparently far exceeds the demand but the mining of the product is an obvious ecological disadvantage.

In addition Mr. Friberge admits the diatomite mortar is fibrous and makes hand-mixing hard work. Other experiments utilizing fibrous materials in combination with cement for producing a building material have been attempted such as those shown in the Erricks U.S. Re. No. 24,003, Weiss U.S. Pat. No. 1,631,171, Bridgeford U.S. Pat. No. 3,533,725, Marra U.S. Pat. No. 3,671,377, Breslauer U.S. Pat. No. 3,705,837 and the Tjannberg U.S. Pat. No. 4,228,202. The Breslauer reference relates to wood flakes coated with portland cement; Weiss relates to the making of wall board from wood paste; Erricks shows a stabilizer for cellulosic materials; Bridgeford uses wood fibers mixed with polymer; Marra shows wood mass mixed with a binder; and Tjannberg discloses a method for making a cellulosic material fire resistant. None of the prior references and experiments appear to have successfully solved the problem of fibrous based building materials.

SUMMARY OF THE INVENTION

The present invention contemplates a building material utilizing fibers or other waste products as a component in the construction of the building material and a method for making the building material which has been particularly developed for overcoming the foregoing disadvantages. The novel method utilizes organic waste products which are normally considered an economic loss and many of which are pollutants or ecological disadvantages. Broadly the novel process comprises adding lime, which may be kiln dust (a widespread waste product) or the like, in preselected or predetermined quantities or ratios by volume to the organic waste product. Examples of the waste product are sawdust, cotton hulls, nut hulls, corn husks or other plant fibers. The limed mixture is then allowed to season and cure through a predetermined time period in accordance with the chemical characteristics of the waste product used. The material at this stage may be "held" for on-site use, such as for pouring walls or the like, or may be delivered to a fabricating plant for molding or shaping into bricks, sheets, blocks, or panels to provide low cost, lightweight, substantially fire-proof easily worked construction materials for building blocks, insulation and the like. The aggregate produced by the method may be mixed with cement, cement-fly-ash mixture, or high test rapid setting gypsum cement to provide the end product. In other words the sludge may be utilized in any well known formula for producing a concrete material. When the plant fiber is sawdust or crushed hulls or crushed burrs the required additional water is mixed with cement first and the aggregate or sawdust is added into the wetted cement in premeasured amounts.

The vegetable fibers which may come from shelling, pressing, sawing and shaping, or the like, to be treated are first dried and placed in a solution which as a general rule is one part lime to eight parts water by volume. The dry material goes into the whitewash mixture (lime water) and apparently tries to soak up the moisture. It further appears that the lime attaches to and becomes imbedded in the cell wall of the vegetable fibers and when the product dries the dry product maintains its expanded volume. The lime may make a masonry cement (chemical bond) as the lime and portland cement, for example, become masonary cement.

In order to speed up the process it may be desirable to use the inherent water in any waste sludge being used to mix the lime or fly-ash. A curing time is required in which the lime works through the mass to stop all the chemical reactions (as for example eliminating odors) and it may be necessary to stir the mixture periodically at spaced times during the curing operation. The lime used in the process is often a waste product in and of itself, and which is usually available in huge quantities, such as fly-ash which is a waste from burning coal, tailings and the like. Lime adjusts the PH factor of the fibrous components, seals up the sugars and stops other chemical reactions. The limed materials may then be utilized as the aggregate in substantially any well known concrete mixing operation. The novel method not only produces a lightweight substantially fire-proof insulating building material but also solves many ecological problems in that waste material which is otherwise of difficult disposal may be utilized as a primary ingredient in the process. The process of the invention accepts organic fibrous materials whether in a dry form such as sawdust, hulls, burrs, stems or the like, or as a part of a sludge discharge from wood pulp, paper mills, recycling mills, or rag or linen paper mills and other such plants discharging sludges containing significant volume of water or liquids and fibers. After the sludge has been treated by the process the sludge dries very slowly and when it has become completely dry it apparently will not "wet again". As a consequence it is preferable to accomplish some drying but not complete drying prior to finishing the overall process. The treated sludge may then be stored for future use as required. The novel building material is economical and durable in use and simple and efficient in manufacture.

DETAILED DESCRIPTION OF THE PREFERRED EMBODIMENT

Many industrial processes produce great quantities of waste sludge products containing fibrous components. Substantially any of this waste sludge material may be utilized or processed by the present method to produce an aggregate for the use in the creation of a strong light-weight efficient building material. In addition dry fibrous materials such as sawdust, hulls, burrs, stems and other plant fiber may also be utilized in the process. The novel process acts to adjust the PH factor of the sludge or dry fibrous materials to counter the acidic conditions usually found therein. The process stops biological and bacterialogical processes and seals and contains sugars, resins and chemical groups emitted from the fibers and after an appropriate curing time the process produces the aggregate which may be used as the ingredient in plaster, lime-mortar, fill material or in the preferred product corresponding to a concrete building material.

For purposes of clarification the novel process may be considered in two forms, the first form being the process as applied to "dry" organic fibrous materials and the second being the process as applied to "wet" masses of fibrous material often referred to as "sludge". To further clarify the process the following definitions apply to the products referred to in the process:

Lime as used in this process has been derived from waste "tailings" from a lime hydrating plant, from environmentally hazardous lime industrial wastes, and from the standard masons lime of construction.

Whitewash is a solution of lime in water. The range of lime-to-water is varied for the chemistry of the organic fibrous material being treated.

Whitewash additives: When wastes other than the organic fibrous materials, such as sewage containing fecal coliform, are present or when conditions allow fermentation to be established before the treatment process has started, fly-ash (a waste from coal fired power generations stations) may be added in small amounts. In sludges which tend to form "globs" and resist uniform treatment dry or wet silicates such as sodium or calcium silicate may be introduced into the whitewash just after the whitewashing step to facilitate uniform curing.

Dry organic fibrous materials: The term "dry" is used to deliniate a class of materials which are essentially dry particles not in any mass of contiguous moldable matter. These dry organic fibrous wastes contain a range of moisture content from "tender dry" to rather moist.

Cementing mix: the organic fibrous material being treated by the process of the invention becomes aggregate for a lightweight concrete-like material which may be called "fiber-crete".

Cement which becomes the binder or grout may be portland cement, masonary cement, gypsum cement or similar widely used products or may be combinations such as for example cement (portland type) and fly-ash of suitable characteristics. Cement-fly-ash ratios ranging from small amounts of fly-ash up to 30% by weight cement to 70% fly-ash have been used with good results.

Referring particularly to the "dry" method for the novel process, organic fibrous material may be utilized, such as wood wastes including sawdust chips, shavings, splinters, nut shells from pecans, almonds, walnuts and other nuts which have been cracked and the meats removed, oil nut hulls or husks, peanuts, soy beans and similar materials, cotton hulls and other wastes from processing plant products. Particles of these dry organic fibrous materials may be treated in a fairly wide range of sizes. However, the end product will be greatly affected by the size of the particles in the aggregate. For stronger "fiber-cretes" there should preferably not be large lumps or "wads" of fibers with no cementing grout. For these reasons some materials such as cotton burrs may require crushing in any suitable simple operation before proceeding with the novel process.

The initial step of the dry process comprises the mixing of lime in water at a basic ratio of one volume of lime to eight volumes of water in any suitable mixing vat. Air dry sawdust or other dry materials are then added to the whitewash mix in the vat. There should preferably be an excess whitewashing liquid to allow a thorough stirring and mixing and soaking of the dry fibrous material added thereto. A basic time of stirring and soaking for the mixture is approximately twenty-five minutes. The fibrous material may then be screened on a suitable drain device and any excess whitewash may drain back into the treatment vat for reuse.

Several varities of wood products and some shells have been found to react in a characteristic manner to produce residue, slime or films. When this occurs it may be desirable to skim off such emissions and continue the soaking process with one or more options, such as increasing the amount of lime in the whitewash mixture, lengthening the soak-mixing operation to thirty or thirty-five minutes, and/or introducing an additive such as a small amount of fly-ash to develop a standard procedure for that specific variety of wood or shell.

Some general guidelines and check points for producing the best results in the use of dry fibers may be summarized as follows:

1. The dryer the condition of the organic fiber being used, the faster and more complete will be the absorption of the lime solution and the best results for controlling all factors effecting the final product may be obtained.

2. There must be sufficient lime absorbed and clinging to and/or coating the individual particles to be visible and to stop any further fermentation or decay in the fibrous product.

3. The lime-to-water ratios may be adjusted for both economy and effectiveness with substantially any organic fiber and the lime-water or whitewash mixture will seal or counter acidity, sugar, oil, resins, turpentine and other compounds or components normally considered harmful in the utilization of cement to produce concrete. For example, one variety of nut-wood requires preferably one part lime to six parts water to achieve an optimum end result.

4. Many of the "dry" organic fibers are desirable for aggregate when higher compression strengths are needed for the building construction material. For this purpose the aggregate must be dry for the best strength characteristics and must be withheld from the mixer until cement and water are thoroughly stirred or mixed after which the aggregate may be added to the cement-water mixture.

5. The appearance of considerable slime or foam on the surface of the treatment vat signals the possibility that more lime should be added after the reaction material accumulating in the vat is removed.

6. Appearance and odor are in general satisfactory indicators of good treatment results. Once treated the fibrous aggregate may be stock piled and stored for extended periods before use in the manufacture of a building construction material.

As hereinbefore set forth the process or method of the invention may be efficiently applied to industrial wastes comprising organic fibrous materials discharged in sludges and which may include minerals, earths and other material in water. In addition these sludges frequently contain environmentally hazardous amounts of chemical substances and heavy metals and the storage and disposal of the sludges is a great problem. The preferred method for handling these sludges is to initially screen out fibrous materials at the earliest point of discharge such as at the point of discharge from the industrial plant, removing solids which are lighter than water by simple systems or other similar devices and by allowing solids heavier than water to precipitate to the bottom of the sludge reservoir before collection in sumps subsequent to which they may be transferred to the process system of the invention. Both the heavier and lighter solids collected in the sump and from the screening process are delivered to a vat and immediately mixed with lime in a basic ratio of one volume of lime to eight volumes of sludge. This basic mixture may then be adjusted to treat sludges having special conditions and an additive of fly-ash or silicate may improve the action in certain sludges. The lime-treated sludge may then be slowly churned in an environment which allows water to be released for escape from the mass. In some sludges or "wet" fibers additives of fly-ash or silicate may be introduced to the mass. The churning effect may deliver the treated sludge to a suitable drain station which may be particularly designed to encourage the escape of water from the mass. If the apparatus for churning is a mobile mixer or the like the delivery of the sludge to the drain area is relatively simple. Of course if the churning operation is accomplished in other vats the churned sludge may be delivered to the drain area in any suitable manner.

The treated organic fibrous material is preferably "cured" in the moist condition. For certain materials it is desirable to cure the mass for approximately twenty-four hours for efficiently controlling biological, bacterialogical and chemical processes. The curing time should be monitored and adjusted as required to reduce "pipe line time" or "process time" to a minimum while effectively containing and controlling the objectionable material or activities of the mass. As in the case of the "dry" fibrous materials the treated sludge materials may be stock piled, transported, or stored for use as needed.

After the sludge or dry fibrous materials have been treated by the novel method and after the residue or aggregate material is completely dry it apparently will not "wet" again as hereinbefore set forth. In many instances the drying time may be accellerated by the application of heat. The aggregate may be utilized in the usual manner in substantially any formula for the creation of a cement-like building product. After the treatment of the fibrous products either in the dry stage or wet stage the process for creating the building material is essentially as that in widespread use today.

The building products constructed with the use of the fibrous aggregate produced by the process of the invention has great insulating qualities, is lightweight, strong, and may be utilized in the normal manner of plaster board, concrete and the like. The building blocks or the like constructed from the aggregate accepts nails and other building implements in the usual manner as in present day construction.

From the foregoing it will be apparent that the present invention provides a novel method for creating a building material of superb qualities from fibrous matter normally considered waste products and environmentally disadvantageous. Dry products and/or wet products may be utilized with equal efficiency in the process thus not only producing efficient building materials but also solving an ecological and pollution problem which is widespread today.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing a building material which comprises the steps of initially combining a predetermined ratio of lime to fluid to provide a whitewash fluid, mixing fibrous material with the whitewash fluid to provide a limed mixture, curing the limed mixture through a predetermined time period to produce a resultant aggregate for use in the construction of the building material.

2. A method as set forth in claim 1 wherein the fibrous material is a dry plant fiber.

3. A method as set forth in claim 2 wherein the fluid to which the lime is added is water.

4. A method as set forth in claim 1 wherein the fibrous material is a waste sludge.

5. A method as set forth in claim 4 wherein the waste sludge is in a fluid state.

6. A method as set forth in claim 5 wherein the fluid to which the lime is added is the waste sludge.

7. A method as set forth in claim 1 wherein the curing step dries the limed mixture to produce the aggregate.

8. A method as set forth in claim 7 wherein heat is utilized for accellerating the drying process.

9. A building material comprising a mixture of cement and an aggregate of limed fibrous material.

10. A concrete-type building material wherein the components thereof include an aggregate of limed waste products.

11. A concrete-type building material as set forth in claim 10 wherein the limed waste products are plant fibers.

12. A concrete-type building material as set forth in claim 10 wherein the limed waste product is an industrial sludge.

* * * * *